United States Patent [19]

Inoue et al.

[11] 4,445,480
[45] May 1, 1984

[54] INTAKE SYSTEM OF INTERNAL COMBUSTION ENGINE

[75] Inventors: Mitsumasa Inoue, Yokohama; Ken Nakamura, Kawasaki; Junichi Yokoyama, Ebina; Atsushi Yonezawa, Yokosuka, all of Japan

[73] Assignee: Nissan Motor Company, Limited, Yokohama, Japan

[21] Appl. No.: 460,899

[22] Filed: Jan. 25, 1983

[30] Foreign Application Priority Data

Feb. 15, 1982 [JP] Japan ............................. 57-18545[U]

[51] Int. Cl.³ ............................................. F02M 31/00
[52] U.S. Cl. .................................... 123/432; 123/308; 123/556
[58] Field of Search ............. 123/556, 308, 432, 52 M

[56] References Cited

U.S. PATENT DOCUMENTS

| | | | |
|---|---|---|---|
| 4,086,885 | 5/1978 | Noguchi | 123/432 |
| 4,232,640 | 11/1980 | Matsumoto | 123/308 |
| 4,253,432 | 3/1981 | Nohira | 123/52 M |
| 4,271,795 | 6/1981 | Nakagawa | 123/432 |
| 4,323,041 | 4/1982 | Endo | 123/432 |

FOREIGN PATENT DOCUMENTS 54-74021  6/1979  Japan.

Primary Examiner—Ronald H. Lazarus
Attorney, Agent, or Firm—Lane, Aitken & Kananen

[57] ABSTRACT

An intake system of an internal combustion engine including a power cylinder having an intake valve and a fuel injection nozzle, comprising: a throttle chamber upstream open to the atmosphere; primary and secondary throttle valves provided in parallel with each other in the throttle chamber; primary and secondary air passageways leading from the throttle chamber past the primary and secondary throttle valves, respectively, and conjoined together upstream of the intake valve, the secondary passageway being larger in cross sectional area than the primary air passageway and having a reservoir chamber portion larger in cross sectional area than the remaining portion of the secondary passageway; and air heating means provided in the primary air intake pipe and operative to preheat the air to be passed through the primary air intake pipe.

4 Claims, 3 Drawing Figures

INTAKE SYSTEM OF INTERNAL COMBUSTION ENGINE

FIELD OF THE INVENTION

The present invention relates to an intake system of an internal combustion engine for an automotive vehicle.

SUMMARY OF THE INVENTION

In accordance with the present invention, there is provided an intake system of an internal combustion engine including a power cylinder having an intake valve and a fuel injection nozzle, comprising a throttle chamber upstream open to the atmosphere; primary and secondary throttle valves provided in parallel with each other in the throttle chamber; primary and secondary air passageways leading from the throttle chamber past the primary and secondary throttle valves, respectively, and conjoined together upstream of the intake valve, the secondary passageway being larger in cross sectional area than the primary air passageway and having a reservoir chamber portion larger in cross sectional area than the remaining portion of the secondary passageway; and air heating means provided in the primary air intake pipe and operative to preheat the air to be passed through the primary air intake pipe.

BRIEF DESCRIPTION OF THE DRAWINGS

The features and advantages of an intake system of an internal combustion engine according to the present invention will be more clearly appreciated from the following description taken in conjunction with the accompanying drawings in which like reference numerals designate similar or corresponding assemblies, units and members and in which.

DESCRIPTION OF THE PRIOR ART

Figure 1:
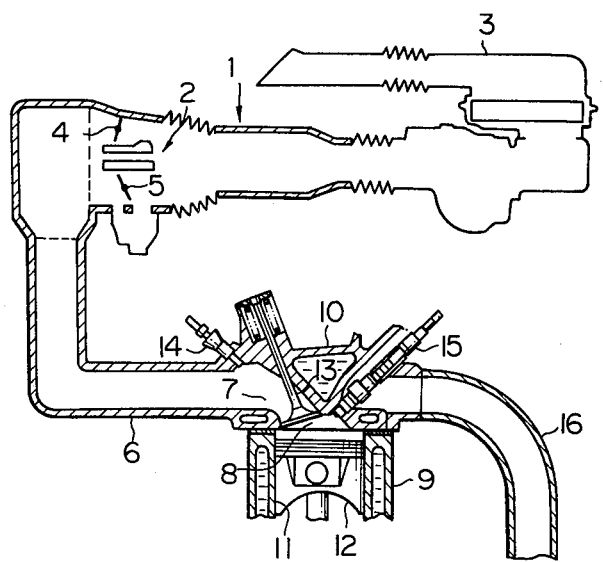
FIG. 1 is a schematic sectional view showing the intake system of a prior-art automotive internal combustion engine.

Referring to FIG. 1 of the drawings, an internal combustion engine having a prior-art intake system comprises an air induction unit 1 formed with a throttle chamber 2 which is upstream open to the atmosphere through an air cleaner 3. The throttle chamber 2 has primary and secondary throttle valves 4 and 5 provided therein in parallel with each other and downstream communicates through an intake pipe 6 with an intake valve 7 which is open to a combustion chamber 8 of each of the power cylinders of the engine. The combustion chamber 8 is formed in part in a cylinder block 9 and in part in a cylinder head 10 secured to the cylinder block 9. The cylinder block 9 is formed with a cylinder bore 11 in which a piston 12 is axially slidable toward and away from the cylinder head 10. An intake valve 13 and a fuel injection nozzle 14 project into the intake valve 7 and a spark ignition plug 15 projects into the combustion chamber 8. The power cylinder further has an exhaust port leading from the combustion chamber 8 past an exhaust valve (not shown) to an exhaust pipe 16.

In the internal combustion engine thus constructed, it is required that the fuel injected into the intake valve 7 be uniformly atomized and mixed with the air entering the combustion chamber 8 and that the resultant combustible mixture of fuel and air be fired properly and reliably under low load conditions when the combustion process to take place in the combustion chamber 8 tends to be unstable. These requirements can be met by reducing the diameter of the intake pipe 6 so as to induce a fast flow of air therein and a swirling flow of combustible mixture in the combustion chamber 8 and/or by provision of air heating means (not shown) in the air induction unit 1 to positively heat the air to be mixed with fuel. Opposed to these requirements is the need for an increased volumetric efficiency under medium to high load conditions of the engine when it is desirable to achieve an increased power output. Such a need can be filled by increasing the diameter of the intake pipe 6 so as to increase the amount of the air to be supplied to the power cylinder and/or by supplying the power cylinder with condense air at low temperatures so as to enable the engine to "breathe". These conflicting requirements can not be fulfilled in a prior-art internal combustion engine of the above described nature since the air induction unit 1 has only one intake pipe 6. It is true that an internal combustion engine is known which has two intake pipes arranged to be put to use selectively depending upon the operating conditions of the engine. Such an internal combustion engine is taught in, for example, Japanese Provisional Patent Publication No. 54-74021 but is not competent to satisfy the above mentioned conflicting requirements under low and medium to high operating conditions of the engine. The present invention contemplates provision of an intake system adapted to meet such requirements of an internal combustion engine.

DESCRIPTION OF THE PREFERRED EMBODIMENT

Figure 2:
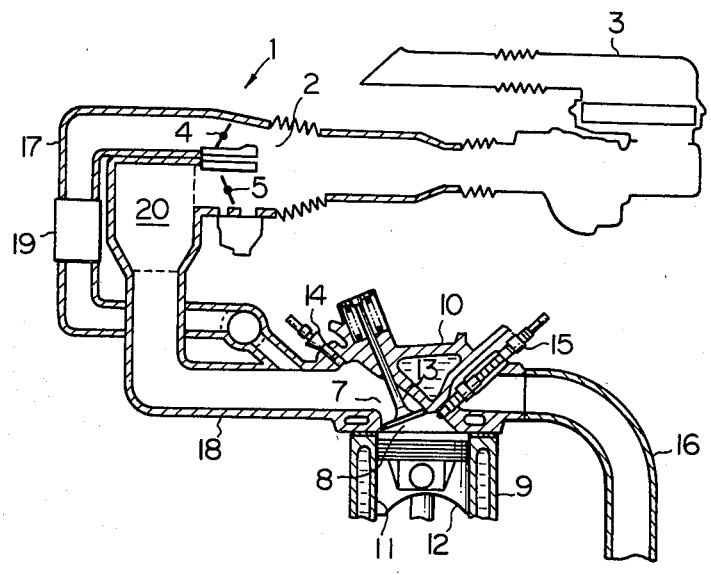
FIG. 2 is a view similar to FIG. 1 but shows a preferred embodiment of an intake system of an automotive internal combustion engine according to the present invention.

Referring to FIG. 2 of the drawings, an internal combustion engine incorporating an intake system embodying the present invention is shown constructed similarly to the prior-art engine illustrated in FIG. 1 except for the construction and arrangement of the intake system. In the engine shown in FIG. 2, the intake system comprises a primary air intake pipe 17 and a secondary air intake pipe 18 in addition to the air induction unit 1 formed with the throttle chamber 2 and the primary and secondary throttle valves 4 and 5 provided in the throttle chamber 2. The primary and secondary air intake pipes 17 and 18 are respectively formed with air passageways branched from the throttle chamber 2 past the throttle valves 4 and 5, respectively and terminate in the intake valve 7 of the power cylinder. The primary and secondary air intake pipes 17 and 18 are conjoined together in the neighborhood of the intake valve 13 and immediately upstream of the fuel injection nozzle 14. The primary air intake pipe 17 is smaller in sectional area than the secondary air intake pipe 18 and is provided with an air heating device 19 operative to positively heat the air to be passed through the primary air intake pipe 17. The primary air intake pipe 17 is thus adapted to establish a high speed stream of air therethrough and accordingly to supply air to the power cylinder under idling or low load operating conditions of the engine. On the other hand, the secondary air intake pipe 18 is larger in cross sectional area than the primary air intake pipe 17 and is adapted to supply a relatively large amount of air to the power cylinder under medium to high load operating conditions of the engine. Furthermore, the secondary air intake pipe 18 has an enlarged portion 20 formed with a reservoir chamber 20 larger in cross sectional area than the passageway in the remaining portion of the pipe 18. The reservoir chamber 20 of the secondary air intake pipe 18 contributes to enhancement of the ram charging effect on the ingoing air under full throttle conditions and to increasing the power output of the engine under low to medium operating conditions in which the engine is most likely to operate.

When the engine is in operation under idling or low load conditions, the primary throttle valve 4 of the air induction unit 1 is kept open with the secondary throttle valve 5 closed. Fresh air sucked in through the air cleaner 3 is thus delivered past the air induction unit 1 and by way of the primary air intake pipe 17 to the power cylinder at a limited rate. While being passed through the primary air intake pipe 17, air is heated by the air heating device 19 efficiently by reason of the relatively small cross sectional area of the pipe 17. The air thus heated positively by the air heating device 19 is admixed to the fuel injected into the intake valve 7 from the fuel injection nozzle 14. The combustible mixture of air and fuel produced in the intake valve 7 is sucked into the combustion chamber 8 past the intake valve 13 and induces a swirling flow therein. The mixture in the combustion chamber 8 is then compressed by the piston 12 moving toward the top-dead-center position thereof and is fired by the ignition spark plug 15. Since, in this instance, the air in the combustible mixture in the combustion chamber 8 is preheated in the primary air intake pipe 17, the mixture is ignited reliably and efficiently and is combusted uniformly in a short period of time, thus providing a stable combustion process under idling or low load operating conditions of the engine. The exhaust gases resulting from the combustible mixture thus combusted completely are discharged from the combustion chamber 8 to the open air through the exhaust pipe 16.

Experiments were conducted with an internal combustion engine incorporating the intake system of the above described nature and having a 1800 milliliters cylinder in an attempt to determine the fuel consumption rate of the engine when the engine was operated in idling conditions of the engine with the revolution of the output shaft of the engine being 650 r.p.m. The experiments have revealed that the fuel consumption rate of the engine was 0.707 liter per hour when the air delivered to the power cylinders through the primary air intake pipe 17 was preheated and 0.727 liter per hour when the air was not preheated. This means that the fuel consumption rate of the engine can be reduced about 3 per cent by preheating the air to be supplied to the power cylinders through the primary air intake pipe 17 under idling conditions of the engine.

Figure 3:
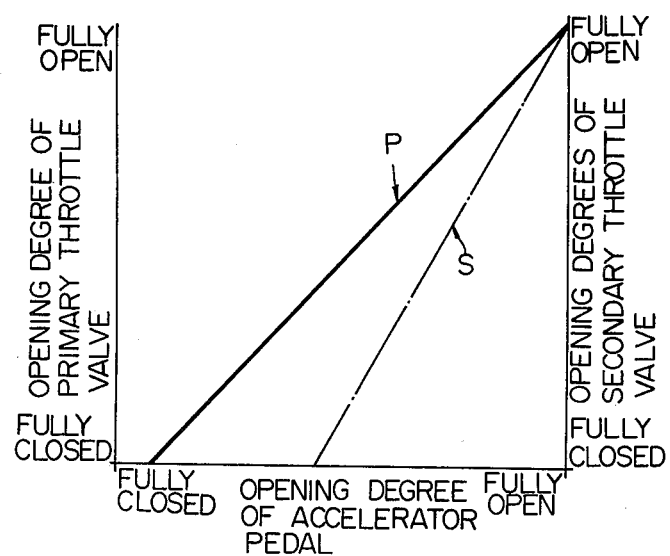
FIG. 3 is a graphic representation of a relationship between the degrees with which the primary and secondary throttle valves provided in the intake system shown in FIG. 2 are to be made open under medium to high operating conditions of the engine.

Under medium to high load operating conditions of the engine, on the other hand, both the primary throttle valve 4 and the secondary throttle valve 5 are kept open. Under these conditions, the primary and secondary throttle valves 4 and 5 are made open to degrees correlated to each other and continuously variable depending upon opening degrees of an accelerator pedal with a predetermined relationship established therebetween as shown in FIG. 3. In FIG. 3, plots p and s indicate the opening degrees of the primary and secondary throttle valves 4 and 5, respectively, in terms of the degree to which the accelerator pedal (not shown) is depressed. Though not shown in the drawings, the intake system according to the present invention includes valve control means responsive to low, medium and high load operating conditions of the engine and operative to cause the primary throttle valve 4 to open in response to the low load operating conditions and to cause both of the primary and secondary throttle valves 4 and 5 to open to degrees variable with the relationship shown in FIG. 3.

Both of the primary and secondary throttle valves 4 and 5 being made open, the air drawn into the throttle chamber 2 through the air cleaner 3 is directed past the primary and secondary throttle valves 4 and 5 and by way of the primary and secondary air intake pipes 17 and 18 into the intake valve 7 at a rate higher than the rate at which air is to be supplied through the primary air intake pipe 17 alone under idling or low load operating conditions of the engine. The air flowing in the secondary air intake pipe 18 is passed through the reservoir chamber 20 of the pipe 18 and is thus permitted to flow toward the intake valve 7 without being subjected to appreciable resistance. The streams of air passed through the primary and secondary air intake pipes 17 and 18 are joined together immediately upstream of the fuel injection nozzle 14 and are admixed to the fuel injected at a high rate into the intake valve 7 from the fuel injection nozzle 14. The mixture of air and fuel thus produced contains the air preheated by the air heating device 19 in the primary air intake pipe 17. The proportion of such preheated air in the mixture is, however, far smaller than the proportion of the remaining air in the mixture so that the temperature of the combustible mixture produced in the intake valve 7 is sufficiently lower than the temperature of the combustible mixture produced in the intake valve of a conventional internal combustion engine. The air-fuel mixture produced in the intake valve 7 is drawn past the intake valve 13 into the combustion chamber 8 with a high volumetric efficiency and is compressed by the piston 12 moving toward the top-dead-center position thereof. The mixture is then fired by the ignition spark plug 15 and is combusted in the combustion chamber 8. The exhaust gases resulting from the combustible mixture thus combusted completely are discharged from the combustion chamber 8 to the open air through the exhaust pipe 16.

When the engine is operating under high load conditions, the reservoir chamber 20 of the secondary air intake pipe 18 provides a ram charging effect and lends itself to improving the power output performance and driveability of the engine. The reservoir chamber 20 further contributes to smooth distribution of air into the individual power cylinders of the engine and to improving the volumetric efficiency in each of the power cylinders under medium to high load operating conditions of the engine.

While the primary and secondary air intake pipes 17 and 18 are constructed separately of each other in the embodiment of the intake system hereinbefore described, the primary and secondary passageways of an intake system according to the present invention may be formed in a single pipe having a partition wall separating the two passageways from each other. On the other hand, the fuel injection nozzle 14 may be arranged to be open into the primary air intake pipe 17 and/or may be provided with a spiral element (not shown) adapted to conically enlarge the jet stream of the fuel to be injected from the nozzle 14 for improving the atomization of fuel. If desired, furthermore, the primary throttle valve 4 may be bypassed by a bypass passageway leading from the throttle chamber 2 and terminating in the vicinity of the fuel injection nozzle 14 so that the fuel injected into the intake valve 7 from the nozzle 14 is injected upon by the air circulated through the bypass passageway and is uniformly atomized and admixed to the air. The fuel injection nozzle 14 may be actuated to inject fuel into the intake valve 7 at timings synchronized with the timings at which the intake valve 13 is actuated to open and close, whereby fuel is injected into the stream of air flowing through the intake valve 7 into the combustion chamber 8 so that the fuel and air are mixed together efficiently.

What is claimed is:

1. An intake system of an internal combustion engine including a power cylinder having an intake valve and a fuel injection nozzle, comprising
   a throttle chamber upstream open to the atmosphere;
   primary and secondary throttle valves provided in parallel with each other in said throttle chamber;
   primary and secondary air passageways leading from the throttle chamber past the primary and secondary throttle valves, respectively, and conjoined together upstream of said intake valve, the secondary air passageway being larger in cross sectional area than the primary air passageway and having a reservoir chamber portion larger in cross sectional area than the remaining portion of the secondary air passageway; and
   air heating means provided to the primary air passageway and operative to preheat the air to be passed through the primary air passageway.

2. An intake system as set forth in claim 1, in which said primary and secondary air passageways are conjoined together immediately upstream of said fuel injection nozzle.

3. An intake system as set forth in claim 1, in which said fuel injection nozzle is located such that fuel is injected into the preheated air.

4. An intake system as set forth in claim 1, in which said primary and secondary air passageways are respectively formed in primary and secondary air intake pipes which are constructed separately of each other.

* * * * *